Nov. 24, 1970  H. POREPP  3,541,638
APPARATUS FOR PRODUCING CONTINUOUS ROWS OF
SLIDING CLASP FASTENER LINK MEMBERS
Filed Dec. 7, 1967  3 Sheets-Sheet 1

HANS POREPP
INVENTOR
Karl J. Ross
Attorney

Nov. 24, 1970  H. POREPP  3,541,638
APPARATUS FOR PRODUCING CONTINUOUS ROWS OF
SLIDING CLASP FASTENER LINK MEMBERS
Filed Dec. 7, 1967  3 Sheets-Sheet 2

HANS POREPP
INVENTOR

Karl F. Ross
Attorney

United States Patent Office 3,541,638
Patented Nov. 24, 1970

3,541,638
APPARATUS FOR PRODUCING CONTINUOUS ROWS OF SLIDING CLASP FASTENER LINK MEMBERS
Hans Porepp, Am Rebberg, Wangen (Bodensee), Germany
Filed Dec. 7, 1967, Ser. No. 688,845
Claims priority, application Germany, Dec. 14, 1966, P 41,000
Int. Cl. B29d 5/00
U.S. Cl. 18—1  10 Claims

ABSTRACT OF THE DISCLOSURE

Apparatus for forming a plastics thread into a continuous row of sliding clasp fastener link members to form a shape which is either a flattened helical spring or in section a prone figure-of-eight. The apparatus uses a thread guide to transport the plastics thread to and fro and a stamping die to produce coupling surfaces of the thread. The invention consists in the provision of a circumferentially toothed guide disc which is intermittently rotatable by an amount that corresponds to a predetermined distance between the link members and the thread guide is arranged to move the thread to and fro through each gap between two teeth, the thread passing through a channel in the guide member that faces the circumference of the disc. The thread guide also has a stamped projection and is moved forwards and backwards before one or both reverse movements radially towards the face of one or more anvils respectively fixed on one or both sides of the guide disc. The anvil face or faces is/are in substantial alignment with the bottom of the gap between the teeth and is used to back up the projection to stamp coupling surfaces on the thread, these surfaces when made preventing the thread from passing through the gaps when the thread guide is reversed.

BACKGROUND OF THE INVENTION

The present invention relates to apparatus for forming a plastics thread into a continuous row of sliding clasp fastener link members in the form of a flattened helical spring or a shape which, in section, takes the form of a prone figure-of-eight, by using a thread guide that transports the plastics thread to and fro, coupling surfaces being stamped on the thread.

Apparatus is already known for producing a continuous row of sliding clasp fastener link members that is arranged to pass a plastics thread by means of a thread guide through a gap in a row of teeth, to fold the thread around the end of the tooth and then return it through the next gap, so that the thread passes in a meander-like manner, the meander being provided on the centre longitudinal line with a deformation serving as a coupling surface, or an additional stamping die being provided which works parallel to the length of the teeth and presses the thread against the front surfaces of the teeth in order to produce a coupling surface.

SUMMARY OF THE INVENTION

It is an object of the invention to provide apparatus of simpler construction than that hitherto known and by which a row of sliding clasp fastener link members having coupling surfaces can be economically produced in the form of a flattened helical spring or a shape which, in cross section takes the form of a prone figure-of-eight.

To this end, apparatus according to the invention comprises a circumferentially toothed guide disc which is intermittently rotatable by an amount corresponding to a predetermined distance between the sliding clasp fastener link members to be formed, and a thread guide for moving the thread to and fro through each gap between two teeth through a channel in said guide and facing the circumference of the disc, said thread having a guide stamped projection and being moved forwards and backwards before at least one reverse movement radially towards the face of an anvil fixed on at least one side of said guide disc, said face being in substantial alignment with the bottom of the gap between the teeth, thereby to stamp coupling surfaces on the plastics thread, said surfaces preventing the thread from passing through the gaps when the thread guide is reversed.

To form a flattened helical spring shape, the circumference of the guide disc is provided with only one row of teeth and an anvil face is provided on one side only of the guide disc, the thread guide being arranged to pass the thread, by moving from one side of the disc to the anvil side, through a gap between two teeth, whereupon, to stamp the coupling surface the guide is moved, with its stamped projection adjacent the guide disc, radially against the anvil for a distance corresponding to the height of the tooth, and radially outwardly again, and then returns the thread to the other side of the guide disc through a similar gap, and the processes being subsequently repeated after the guide disc has been moved on by a distance corresponding to one tooth pitch.

This particular shape is possible due to the fact that the stamped coupling surface lies on the anvil side when the thread guide returns against the front edges of both adjacent teeth and is held fast thereby, whilst the thread passes around the end of the tooth in a curve corresponding to the pitch of the row of link members after the thread guide has completed its return, the guide disc is moved on and the guide thread is moved again about the front side of the tooth on the side of the teeth away from the anvil.

To produce the shape of a prone figure-of-eight, the guide disc is provided on its circumference with two spaced parallel rows of teeth and the thread guide is provided on both sides of the outlet of its thread guide channel with a stamped projection and a radial movement is effected followed by a radial outward movement on the outer sides of both rows of teeth against a stationary anvil, and the guide disc is rotated forwards by the pitch of a tooth or a multiple of a tooth pitch when the outlet of the thread guide channel is located in the region between both rows of teeth of the guide disc when the thread guide is moving in either direction.

In order to obtain a complete insertion of the plastics thread into the gap during the individual movements of the thread guide, where the winding parts adjacent the coupling surfaces abut closely on and over one another, the thread guide is provided on one or both opposite outer sides of the stamped projections with a lug extending radially to the guide channel of the thread guide in the direction of movement, having a thickness corresponding to the width of the gap between teeth, said one or more lugs abutting in the gaps between the teeth against the transported plastics thread during the stamping process and pressing the thread against the curve of the gap.

By using this lug or lugs, which lie against the plastics thread guided through the gap during the stamping stroke of the thread guide, that the bottom of the gap on one or both anvil sides may be shortened by an inclined section with respect to the length of the tooth and the remaining bottom, which is displaced to one side, may be moved somewhat outwardly and radially with respect to the anvil face. Therefore the shortened bottom of the gap will be stamped in the thread as soon as the thread guide carries out its movement against the circumference of the guide disc, so that the individual windings of the row of link members are provided on one side with a groove running in the longitudinal direction of the row of link members, into which groove a sewing thread can be inserted when the row of link members is being sewn to a stringer tape and can thereby hold the individual windings or members fast against a movement transverse to the longitudinal direction of the row of link members.

DESCRIPTION OF THE PREFERRED EMBODIMENTS

Figure 1:
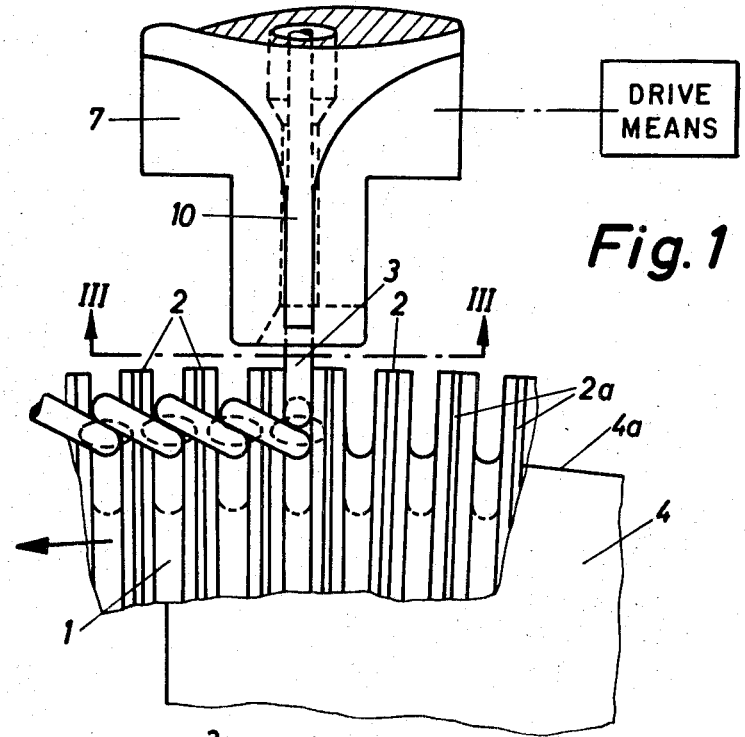
FIG. 1 shows a schematic side view of a part of the circumference of a circular guide disc with thread guide.
Figure 2:
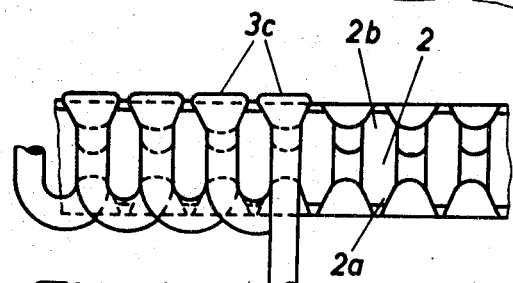
FIG. 2 shows a partial view of the circumference of the guide disc illustrating a few turns, which have already been made, of a row of sliding clasp fastener link members in the form of a flattened helical spring.
Figure 3:
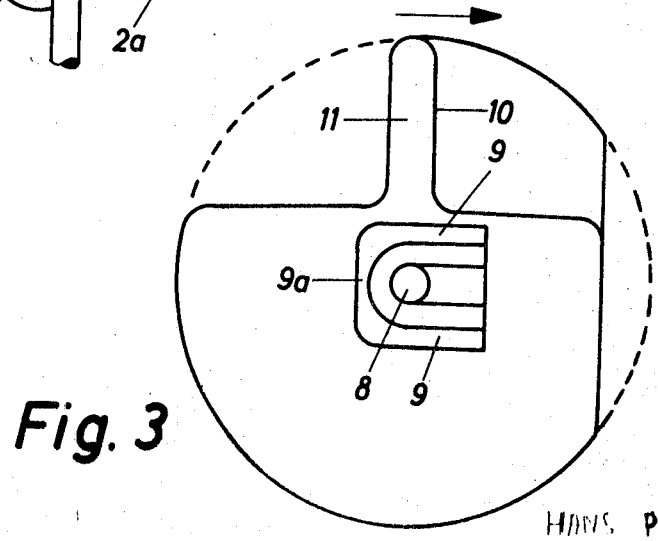
FIG. 3 shows a front view of the thread guide, along line III—III of FIG. 1, FIGS. 4 to 6 show three part cross-sections through the guide disc with the thread guide in three different working positions and shown schematically in section.
Figure 4:
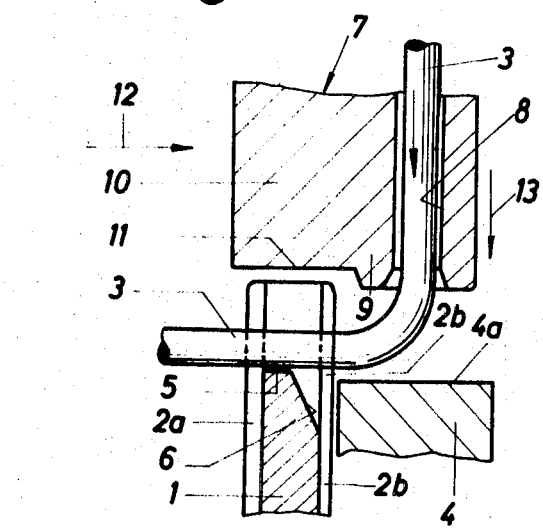
Figure 5:
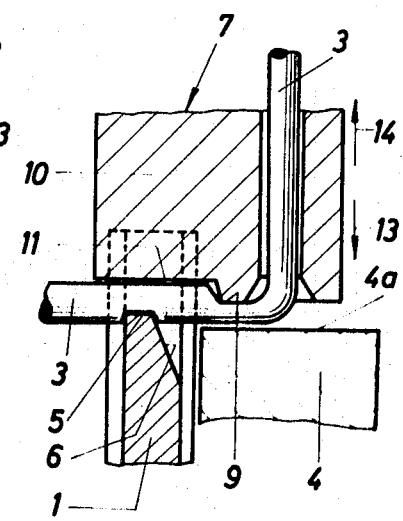
Figure 6:
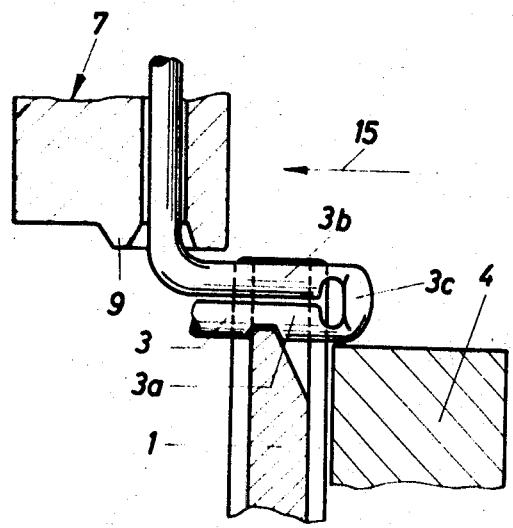

Referring now to the drawings, and the embodiment according to FIGS. 1 to 6, there is shown apparatus for forming a plastics thread into a row of sliding clasp fastener link elements in the form of a flattened helical spring. This apparatus consists of a circular disc 1 whose circumference is provided with the teeth 2 running transversely thereto, whose width corresponds to the helical pitch of the spring shape to be produced and the gaps between which correspond to the thickness of the plastics thread 3 to be formed. The sides of two adjacent teeth are, as may be seen from FIGS. 1 and 2, constructed to diverge outwardly at both sides, i.e. both ends of the teeth 2 are in the form of a truncated cone, as is shown at 2a in FIG. 2. This divergence of the opposing sides of two adjacent teeth of the guide disc 1 can, for example, be produced by grinding the guide disc by means of a corresponding profiled grinding disc, in the region of the gap between the teeth, grinding being effected on the "body" of the guide disc and the teeth sides at the ends of the latter. On one side, immediately adjacent the side surface of the guide disc, there is provided a stationary anvil 4, having an anvil face 4a which is substantially in alignment with the bottom of the gaps. In a special construction as shown in FIGS. 4 to 6, the bottom 5 of the gap is shortened in length by the provision of an inclined section 6, this latter being positioned in the anvil side of the disc 1. In this case, the bottom 5 of the gap opposite the anvil face 4a is displaced somewhat radially and outwardly, by part of the thickness of the plastics thread 3 to be formed. The object of this construction is as follows, the guide disc 1 being rotatably mounted in a housing (not shown) and being intermittently moved on by one tooth pitch, as will also be explained in greater detail.

A thread guide 7 is associated with the above described guide disc 1, by means of which the plastics thread 3 is passed through a channel 8 which is radial to the axis of the guide disc. In this way, the thread advantageously firstly passes through a brake, by means of which the desired tension of the thread is ensured. There is provided on the outlet side of the guide channel 8 of the thread guide 7, a stamped projection 9 adjacent thereto, which advantageously surrounds the guide channel 8 in the form of a U, the web or base 9a of this U-shaped stamped projection extending towards the guide disc 1. The stamped projection may, however, alternatively completely encircle the end of the channel. A lug 10 is connected to the stamped projection 9 of the thread guide 7 radially to the guide channel 8, the thickness of said lug corresponding to the width of the gaps between teeth of the guide disc and its front face 11 facing the guide disc, namely parallel to the axis of the guide disc, this front face 11 being displaced radially and outwardly with respect to the axis of the guide disc by the amount of projection of the stamped projection 9.

The described apparatus for producing a row of sliding clasp fastener link members in the form of a flattened helical spring operates as follows:

The thread guide 7 is first located with its guide channel 8 and the U-shaped stamped projection 9 radially outside the teeth of the guide disc on the side of this disc 1 away from the anvil 4; the guide is then moved, corresponding to FIG. 4, from left to right, until the stamped projection 9 is level with the side of the guide disc at the anvil side. This movement is indicated by the arrow 12. Then the thread guide 7 moves in the direction of the arrow 13 towards the circumference of the disc 1 and the anvil 4, and thereby stamps a coupling surface on the thread 3 against the anvil 4 as shown in FIG. 5, forming a widening of the thread. At the same time, the front surface 11 of the lug 10 lies between two adjacent teeth towards the thread length existing in the gap between the teeth and presses the thread against the bottom 5 of the gap. Since, as has already been mentioned, this bottom 5 now projects somewhat radially and outwardly with respect to the anvil face 4a, a groove is thereby pressed into the thread, which groove runs in the longitudinal direction of the row of sliding clasp fastener link members to be produced and later serves to accommodate the sewing thread by which the row of sliding clasp fastener link members is sewed to a stringer tape, so that there is no transverse movement of the row of the fastener link members after sewing to the stringer tape. After the coupling surfaces have been stamped by means of the stamped projection 9, the thread guide 7 is forced to move radially outwardly in the direction of the arrow 14, until the stamped projection 9 is again located radially beyond the teeth 2 of the guide disc 1, and then the thread guide 7 moves outwardly in the direction of the arrow 15 according to FIG. 6, until the thread guide has reached its original position again. During this movement, the thread 3 is guided back immediately above the part of the thread transported in the other direction, the returned part of 3b of the thread lying against the guided part 3a of the thread, this being possible because the coupling surface 3c lies against the diverging parts 2b of the sides of two adjacent teeth and is held fast there. Due to the convergence of the tooth ends 2a and 2b, no deformation can form on the stamped coupling surfaces 3c through the tension forced on the thread, which deformation would otherwise occur on the sharp edges of the teeth, and furthermore, the width of the row of link members is now clearly defined, since varying deformations of the coupling surface cannot occur. The coupling ear thereby produced is located in the region of double the thread thickness, as may be seen from FIG. 6. After the thread guide 7 has been moved transversely and backwards corresponding to FIG. 6, the guide disc 1 is moved on by one tooth pitch, and in this way the thread is held back by the web 9a of the U-shaped stamped projection 9, so that the thread then passes round the end edge of the following tooth 2, in the form of a truncated cone, in a curve corresponding to the pitch, when the thread guide 7 is again moved forward corresponding to FIG. 4. Thereupon, the described processes corresponding to FIGS. 4 to 6 are repeated. For each forward movement and subsequent movement in the direction of the arrow 13, the thread is completely pressed inwardly into the gap until it reaches the bottom, when moving through the front surface 11 of the lug 10 and thereby makes it possible for the returning part of the thread 3b of the preceding gap to be in even abutment against the part 3a of the thread.

Figure 7:
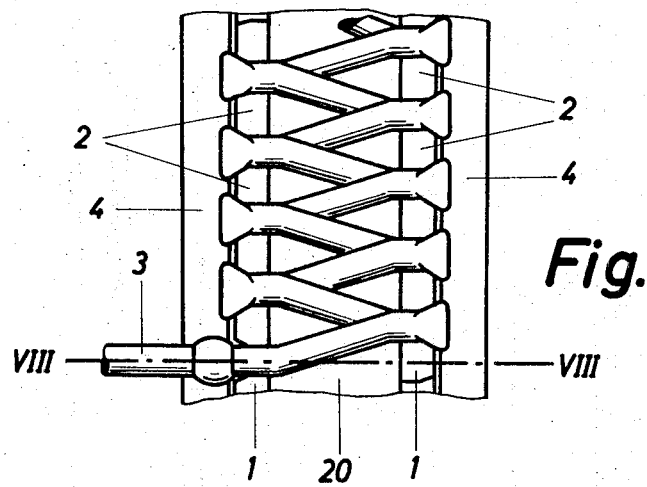
FIG. 7 shows a plan view of part of a modified guide disc with a row of sliding clasp fastener link members having the shape, in section, of a prone figure-of-eight.
Figure 8:
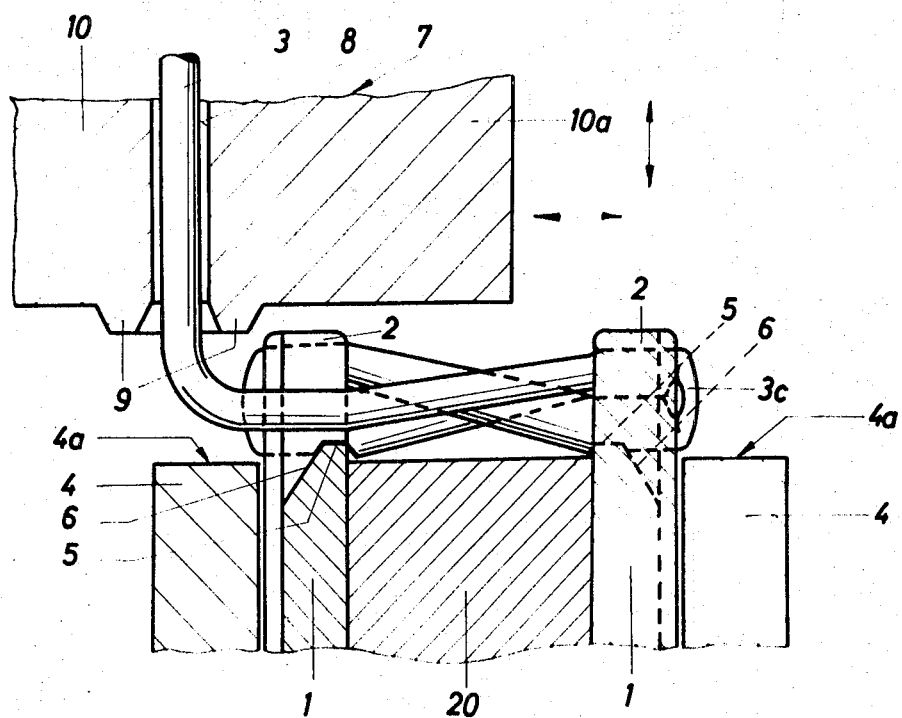
FIG. 8 shows an enlarged schematic part section through the guide disc according to FIG. 7 with thread guide.

In the embodiment according to FIGS. 7 and 8, is shown an apparatus having a guide disc provided on its circumference with two spaced parallel rows of teeth 2, and this disc can be made for example by connecting together two guide discs 1 corresponding to FIGS. 1 to 6, by means of an interposed ring 20, so that the teeth 2 of one disc can be staggered with respect to the teeth 2 of the other disc or are located axially parallel opposite one another. Two stationary anvils 4 are provided on the outsides of the guide discs 1, the anvil faces 4a of which are again in substantial alignment with the gaps 5, the bottoms of the gaps advantageously being shortened by an inclined section 6 and projecting somewhat outwardly and radially with respect to the anvil face 4a and the intermediate ring 20 in order to be able to produce the aforementioned grooves for accommodating the sewing thread.

The thread guide 7 is essentially the same as that described with reference to FIGS. 1 to 6, but with the exception that a second similar lug 10a is added in the direction of movement of the lug 10, transverse to the rows 2 of teeth opposite the guide channel 8, adjacent one arm of the U-shaped stamped projection 9 or of a circular stamped projection. This modified embodiment makes it possible to produce a row of sliding clasp fastener link members having the sectional profile of a prone figure-of-eight. In this embodiment, the plastics thread 3 is passed by means of the thread guide 7 firstly from left to right through a gap in the left-hand row of teeth 2, and then the rows of teeth 2 are moved on by the width of a tooth when the thread guide moves again, so that the thread is then passed through a gap in the right-hand row of teeth 2 staggered by the width of a tooth. At this moment, the thread guide is moved radially against the right-hand side anvil 4, so that the left-hand stamped projection 9, with reference to the drawing, stamps a coupling surface 3c on the thread, the thread at the same time being completely pressed into the gap by the lug 10. The thread guide 7 then moves radially and outwardly again and in reverse direction through a similar gap in the right-hand row of teeth 2, so that the returning thread lies immediately against the forward-moving thread. The thread cannot pass through the gap between the teeth due to the stamped coupling surface 3c. After passing the thread through this gap in the right-hand row of teeth 2, both rows of teeth 2 or the guide discs are again moved on by the width of a tooth, so that the thread guide then passes the thread through the next gap in the left-hand row of teeth 2, and then the thread guide moves radially again against the left-hand anvil 4 and, with the right-hand stamped projection 9, stamps a coupling surface and, at the same time, presses the thread, by the lug 10a, completely against the bottom of the gap. The thread is then passed forwardly through a similar gap in the left-hand teeth 2 after a corresponding radial outward movement of the thread guide, whereupon the described processes are repeated.

The mode of operation of this apparatus produces a row of sliding clasp fastener link members having a sectioned profile in the form of a prone figure-of-eight as may be seen from FIGS. 7 and 8, this row of link members being provided on both outer sides with coupling surfaces. This row of link members can also be curved about the centre longitudinal line to form a U, so that a double row of sliding clasp fastener link members is produced having staggered coupling surfaces.

It is, of course, also possible to produce similar rows of link members having two toothed guide discs, the teeth of which are not staggered, it then, however, becoming necessary to move on both guide discs each time that the thread guide moves backwards and forwards by one tooth in the area between both rows of teeth.

The described movement of the thread guide can be effected in various ways by eccentric drives, by guide rod drives with stops or the like, it also being possible to trigger these movements by an eccentric drive of the guide disc 1 via guide rods or the like. In order that the thread passed through the gaps between the teeth remain in the form prescribed, it is possible to provide the guide disc or discs 1 or the surrounding housing with a heating device, by which the transported thread is stabilised in shape and which simplifies the stamping of the coupling surfaces and the groove for the sewing thread, since a certain degree of plasticisation of the plastics thread is hereby achieved.

I claim:
1. An apparatus for making continuous coupling elements for slide fasteners, comprising, in combination:
 (a) a cylindrical guide disc having a row of regularly spaced teeth separated from one another by gaps and disposed around its circumference and arranged to be intermittently rotated about its axis in steps equal to the spacing between adjacent teeth;
 (b) a thread guide for advancing a length of synthetic thread between said teeth to form the coupling element, said guide having a guide channel through which the thread passes axially and radially with respect to said disc, each reciprocation having a forward and a return stroke, the sequence of the strokes being the axially forward, radially forward, radially return and axially return;
 (c) means presenting an anvil surface disposed to one side of said disc at appropximately the same level as the bottoms of the gaps;
 (d) means for driving said guide, after each step rotation of said disc and while feeding thread through said channel, along a path having
  (1) a first portion which is parallel to the axis of said disc in the direction from said disc toward said surface for laying forward length of a thread loop in the adjacent gap and for bringing the thread over said surface,
  (2) a second portion in a radial direction toward said surface,
  (3) a third portion in a radial direction away from said surface, and
  (4) a fourth portion in an axial direction from said surface toward said disc for laying a return length of a thread loop over the forward length in the same gap; and
 (e) stamping means on said thread guide adjacent said guide channel and disposed for coacting with said anvil surface for stamping the thread against said surface during the movement of said guide over the second portion of its path to provide a coupling surface at the apex of each loop after it is formed, which coupling surface is wider than the spacing between said teeth to prevent the loop from being pulled back through said teeth during the movement of said guide over the fourth portion of its path and so that the forward and return lengths of the loop are arranged adjacent to one another.

2. An apparatus as defined in claim 1 further comprising means on said guide coating with said disc for pressing the forward length of each loop against the bottom of its associated disc gap as said guide travels over the second portion of its path.

3. An apparatus as defined in claim 2 wherein the axially extending sides of each tooth converge toward each other at at least one axial edge of said tooth.

4. An apparatus as defined in claim 3 wherein a portion of the bottom of each said gap is inclined toward the axis of said disc at the side thereof facing said anvil surface and the remainder of the bottom of each said gap is offset radially outwardly from said anvil surface.

5. An apparatus as defined in claim 4 wherein said channel is oriented substantially radially with respect to said disc for guiding the thread and said stamping means is a U-shaped member surrounding said guide channel, the base of said U-shaped member facing in the direction of rotation of said disc so as to engage and advance the thread when the disc is rotated.

6. An apparatus as defined in claim 4 wherein said guide channel is oriented substantially radially with respect to said disc, and said stamping means is a circular shaped member surrounding said guide channel so as to engage and advance said thread when said disc is rotated.

7. An apparatus as defined in claim 2 wherein there are two parallel, axially spaced rows of teeth, each row arranged along a respective opposite axial end face of said disc, and said guide means include two opposed, spaced apart stamping means.

8. An apparatus as defined in claim 7 wherein the axially extending sides of each tooth converge toward one another at the axially outward side of said tooth.

9. An apparatus as defined in claim 8 wherein there are two anvil surfaces each to a respective side of said disc, and for each row of teeth, a portion of the bottom of each gap extends radially inwardly at the side thereof facing its respective anvil surface.

10. An apparatus as defined in claim 9, wherein there are two discs joined together and said guide channel is oriented substantially radially with respect to said discs for guiding the thread, and said stamping means surround said guide channel.

References Cited

UNITED STATES PATENTS

| | | |
|---|---|---|
| 3,176,637 | 4/1965 | Macfee. |
| 3,229,362 | 1/1966 | Yoshida. |
| 3,255,288 | 6/1966 | Steingruebner. |

H. A. KILBY, JR., Primary Examiner

U.S. Cl. X.R.

29—207.5